(12) United States Patent
He et al.

(10) Patent No.: US 10,997,746 B2
(45) Date of Patent: May 4, 2021

(54) FEATURE DESCRIPTOR MATCHING

(71) Applicant: Honda Motor Co., Ltd., Tokyo (JP)

(72) Inventors: Kun He, Kirkland, WA (US); Yan Lu, Newark, CA (US)

(73) Assignee: Honda Motor Co., Ltd., Tokyo (JP)

(*) Notice: Subject to any disclaimer, the term of this patent is extended or adjusted under 35 U.S.C. 154(b) by 90 days.

(21) Appl. No.: 16/381,373

(22) Filed: Apr. 11, 2019

(65) Prior Publication Data

US 2019/0318502 A1 Oct. 17, 2019

Related U.S. Application Data

(60) Provisional application No. 62/656,731, filed on Apr. 12, 2018.

(51) Int. Cl.
| | |
|---|---|
| *G06T 7/73* | (2017.01) |
| *G06N 3/08* | (2006.01) |
| *G06F 16/55* | (2019.01) |
| *G06T 3/00* | (2006.01) |
| *G06K 9/46* | (2006.01) |
| *G06K 9/62* | (2006.01) |

(52) U.S. Cl.
CPC .............. *G06T 7/74* (2017.01); *G06F 16/55* (2019.01); *G06K 9/4609* (2013.01); *G06K 9/6257* (2013.01); *G06N 3/08* (2013.01); *G06T 3/0056* (2013.01)

(58) Field of Classification Search
CPC ........................................................ G06N 3/08
See application file for complete search history.

(56) References Cited

U.S. PATENT DOCUMENTS

| | | |
|---|---|---|
| 8,108,374 B2 | 1/2012 | Zhang et al. |
| 8,712,157 B2 | 4/2014 | Marchesotti et al. |
| 9,430,718 B1 | 8/2016 | Engström |
| 9,547,807 B2 | 1/2017 | Vidal Calleja et al. |

(Continued)

OTHER PUBLICATIONS

Relja Arandjelovic' and Andrew Zisserman. Three things everyone should know to improve object retrieval. In Proc. IEEE Conference on Computer Vision and Pattern Recogni-tion (CVPR), 2012.

(Continued)

*Primary Examiner* — Leon Viet Q Nguyen
(74) *Attorney, Agent, or Firm* — Rankin, Hill & Clark LLP

(57) ABSTRACT

Feature descriptor matching described herein may include receiving a first input image and a second input image. A feature detector may detect features from the first and second input images. A descriptor extractor may learn local feature descriptors from the features of the first and second input images based on a feature descriptor matching model trained using a ground truth data set. The descriptor extractor may determine a listwise mean average precision (mAP) rank of a pool of candidate image patches from the second input image with respect to a queried image patch from the first input image based on the feature descriptor matching model, the first set of local feature descriptors, and the second set of local feature descriptors. The descriptor matcher may generate a geometric transformation between the first input image and the second input image based on the listwise mAP and a convolutional neural network.

17 Claims, 10 Drawing Sheets

(56) References Cited

U.S. PATENT DOCUMENTS

| | | | |
|---|---|---|---|
| 9,697,233 | B2 | 7/2017 | Di et al. |
| 10,467,768 | B2* | 11/2019 | Xu .............................. G06T 7/60 |
| 2012/0301014 | A1 | 11/2012 | Xiao et al. |
| 2015/0294191 | A1* | 10/2015 | Zhang ..................... G06N 20/00 382/160 |
| 2017/0243084 | A1* | 8/2017 | Soatto ................. G06K 9/6267 |
| 2019/0279338 | A1* | 9/2019 | Bergen ................. G06K 9/4647 |

OTHER PUBLICATIONS

Vassileios Balntas, Karel Lenc, Andrea Vedaldi, and Krystian Mikolajczyk. HPatches: A benchmark and evaluation of handcrafted and learned local descriptors. In Proc. IEEE Conference on Computer Vision and Pattern Recognition (CVPR), 2017.

Vassileios Balntas, Edgar Riba, Daniel Ponsa, and Krystian Mikolajczyk. Learning local feature descriptors with triplets and shallow convolutional neural networks. In Proc. British Machine Vision Conference (BMVC), 2016.

Eric Brachmann, Alexander Krull, Sebastian Nowozin, Jamie Shotton, Frank Michel, Stefan Gumhold, and Carsten Rother. DSAC-differentiable RANSAC for camera localization. In Proc. IEEE Conference on Computer Vision and Pattern Recognition (CVPR), 2017.

Fatih Cakir, Kun He, Sarah Adel Bargal, and Stan Sclaroff. MIHash: Online hashing with mutual information. In Proc. IEEE International Conference on Computer Vision (ICCV), 2017.

Gal Chechik, Varun Sharma, Uri Shalit, and Samy Bengio. Large scale online learning of image similarity through ranking. Journal of Machine Learning Research, 11:1109-1135, 2010.

Christopher B Choy, JunYoung Gwak, Silvio Savarese, and Manmohan Chandraker. Universal correspondence network. In Advances in Neural Information Processing Sys-tems (NIPS), 2016.

Philipp Fischer, Alexey Dosovitskiy, and Thomas Brox. Descriptor matching with convolutional neural networks: a comparison to SIFT. arXiv preprint arXiv:1405.5769, 2014.

Martin A Fischler and Robert C Bolles. Random sample consensus: a paradigm for model fitting with applications to image analysis and automated cartography. Communications of the ACM, 24(6):381-395, 1981.

Xufeng Han, Thomas Leung, Yangqing Jia, Rahul Sukthankar, and Alexander C Berg. MatchNet: Unifying feature and metric learning for patch-based matching. In Proc. IEEE Conference on Computer Vision and Pattern Recogni-tion (CVPR), 2015.

Kun He, Fatih Cakir, Sarah Adel Bargal, and Stan Sclaroff. Hashing as tie-aware learning to rank. In Proc. IEEE Conference on Computer Vision and Pattern Recognition (CVPR), 2018.

Max Jaderberg, Karen Simonyan, Andrew Zisserman, and Koray Kavukcuoglu. Spatial transformer networks. In Advances in Neural Information Processing Systems (NIPS), 2015.

Alex Krizhevsky, Ilya Sutskever, and Geoffrey E Hinton. Imagenet classification with deep convolutional neural networks. In Advances in Neural Information Processing Systems (NIPS), 2012.

Brian Kulis. Metric learning: A survey. Foundations and Trends® in Machine Learning, 5(4):287-364, 2013.

BG Kumar, Gustavo Carneiro, and Ian Reid. Learning local image descriptors with deep siamese and triplet convolutional networks by minimising global loss functions. In Proc. IEEE Conference on Computer Vision and Pattern Recognition (CVPR), 2016.

Marc T Law, Raquel Urtasun, and Richard S Zemel. Deep spectral clustering learning. In Proc. International Conference on Machine Learning (ICML), 2017.

Karel Lenc and Andrea Vedaldi. Learning covariant feature detectors. In ECCV Workshops, pp. 100-117, 2016.

Daryl Lim and Gert Lanckriet. Efficient learning of mahalanobis metrics for ranking. In Proc. International Conference on Machine Learning (ICML), 2014.

Tie-Yan Liu. Learning to rank for information retrieval. Foundations and Trends in Information Retrieval, 3(3):225-331, 2009.

David G Lowe. Distinctive image features from scale-invariant keypoints. International Journal of Computer Vision, 60 (2), 2004.

Brian McFee and Gert R Lanckriet. Metric learning to rank. In Proc. International Conference on Machine Learning (ICML), 2010.

Krystian Mikolajczyk and Cordelia Schmid. A performance evaluation of local descriptors. IEEE Transactions on Pattern Analysis and Machine Intelligence (PAMI), 27(10):1615-1630, 2005.

Ondrej Miksik and Krystian Mikolajczyk. Evaluation of Local Detectors and Descriptors for Fast Feature Matching. 21st International Conference on Pattern Recognition (ICPR 2012) Nov. 11-15, 2012.

Anastasiya Mishchuk, Dmytro Mishkin, Filip Radenovic, and Jiri Matas. Working hard to know your neighbor's margins: Local descriptor learning loss. In Advances in Neural Information Processing Systems (NIPS), 2017.

Hyun Oh Song, Yu Xiang, Stefanie Jegelka, and Silvio Savarese. Deep metric teaming via lifted structured feature embedding. In Proc. IEEE Conference on Computer Vision and Pattern Recognition (CVPR), 2016.

Mattis Paulin, Matthijs Douze, Zaid Harchaoui, Julien Mairal, Florent Perronnin, and Cordelia Schmid. Local convolutional features with unsupervised training for image retrieval. In Proc. IEEE International Conference on Computer Vision (ICCV), 2015.

Nikolay Savinov, Akihito Seki, Lubor Ladicky, Torsten Sattler, and Marc Pollefeys. Quad-Networks: Unsupervised learning to rank for interest point detection. In Proc. IEEE Conference on Computer Vision and Pattern Recognition (CVPR), 2017.

Johannes L. Schönberger, Hans Hardmeier, Torsten Sattler, and Marc Pollefeys. Comparative evaluation of hand-crafted and learned local features. In Proc. IEEE Conference on Computer Vision and Pattern Recognition (CVPR), 2017.

Matthew Schultz and Thorsten Joachims. Learning a distance metric from relative comparisons. In Advances in Neural Information Processing Systems (NIPS), 2004.

Edgar Simo-Serra, Eduard Trulls, Luis Ferraz, lasonas Kokkinos, Pascal Fua, and Francesc Moreno-Noguer. Discriminative learning of deep convolutional feature point descriptors. In Proc. IEEE International Conference on Computer Vision (ICCV), 2015.

Karen Simonyan, Andrea Vedaldi, and Andrew Zisserman. Learning local feature descriptors using convex optimisation. IEEE Transactions on Pattern Analysis and Machine Intelligence (PAMI), 2014.

Yurun Tian, Bin Fan, and Fuchao Wu. L2-Net: Deep learning of discriminative patch descriptor in Euclidean space. In Proc. IEEE Conference on Computer Vision and Pattern Recognition (CVPR), 2017.

Tomasz Trzcinski, Mario Christoudias, Pascal Fua, and Vincent Lepetit. Boosting binary keypoint descriptors. In Proc. IEEE Conference on Computer Vision and Pattern Recognition (CVPR), 2013.

Evgeniya Ustinova and Victor Lempitsky. Learning deep embeddings with histogram loss. In Advances in Neural Information Processing Systems (NIPS), 2016.

Yannick Verdie, Kwang Yi, Pascal Fua, and Vincent Lepetit. TILDE: a temporally invariant learned detector. In Proc. IEEE Conference on Computer Vision and Pattern Recognition (CVPR), 2015.

Zhenhua Wang, Bin Fan, and Fuchao Wu. Local intensity order pattern for feature description. In Proc. IEEE International Conference on Computer Vision (ICCV), 2011.

Simon Winder, Gang Hua, and Matthew Brown. Picking the best DAISY. In Proc. IEEE Conference on Computer Vision and Pattern Recognition (CVPR), 2009.

Chao-Yuan Wu, R. Manmatha, Alexander J. Smola, and Philipp Krahenbuhl. Sampling matters in deep embedding learning. In Proc. IEEE International Conference on Computer Vision (ICCV), 2017.

Kwang Moo Yi, Eduard Trulls, Vincent Lepetit, and Pascal Fua. LIFT: Learned Invariant Feature Transform. In Proc. European Conference on Computer Vision (ECCV), 2016.

Sergey Zagoruyko and Nikos Komodakis. Learning to compare image patches via convolutional neural networks. In Proc. IEEE Conference on Computer Vision and Pattern Recognition (CVPR), 2015.

(56) References Cited

OTHER PUBLICATIONS

Xu Zhang, Felix X. Yu, Sanjiv Kumar, and Shih-Fu Chang. Learning spread-out local feature descriptors. In Proc. IEEE International Conference on Computer Vision (ICCV), 2017.

* cited by examiner

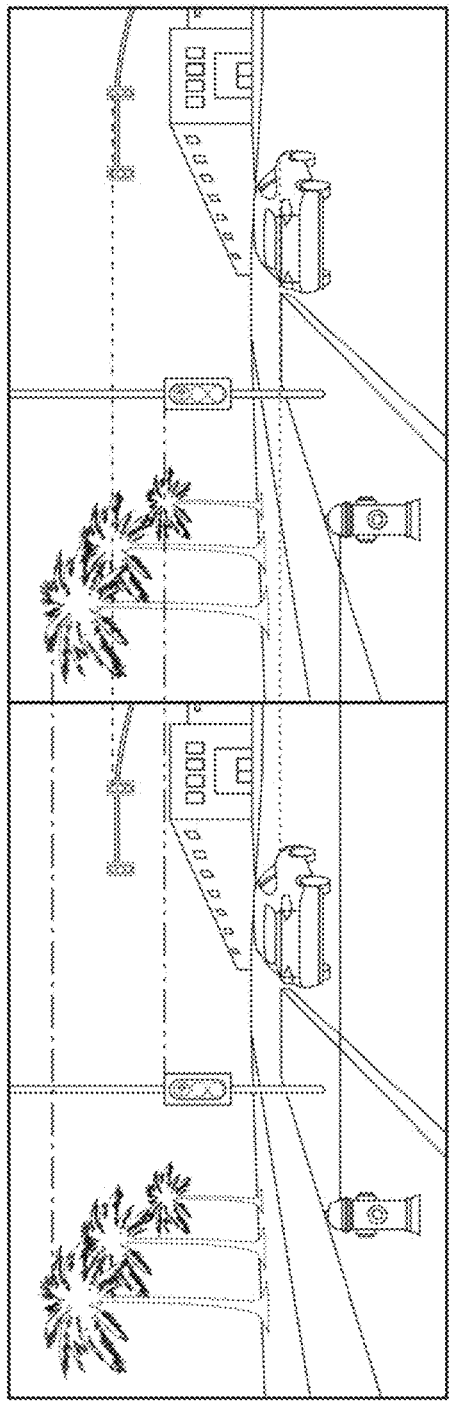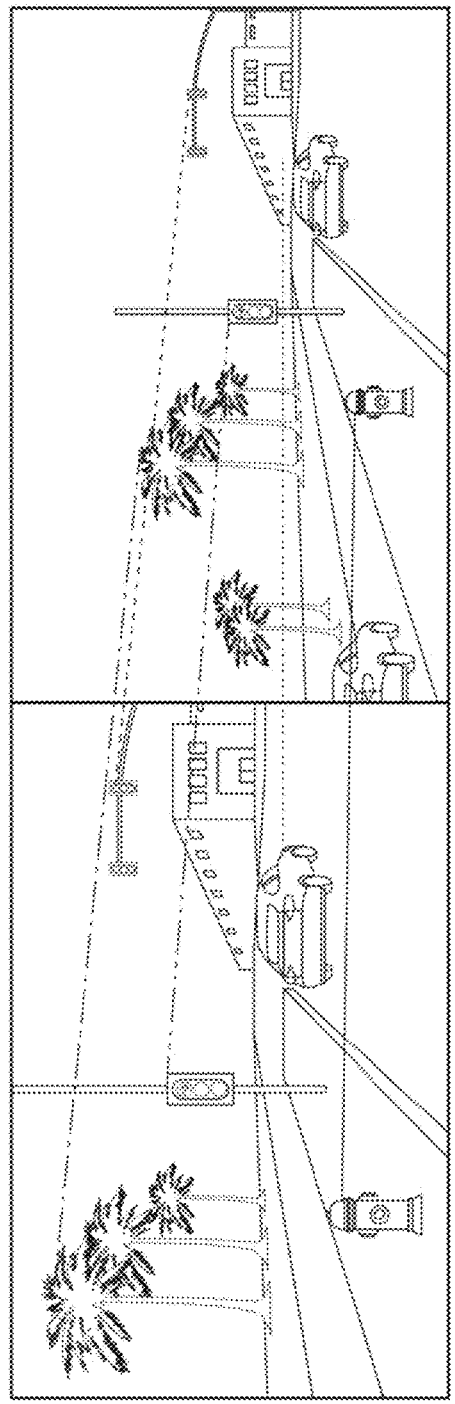
FIG. 10A
FIG. 10B

FEATURE DESCRIPTOR MATCHING

BACKGROUND

A global positioning system (GPS) is often used to determine a location of a vehicle. For example, GPS may require a space based satellite navigation system that determines a location based on multiple GPS satellites. Often GPS is operational as long as there is an unobstructed view from the vehicle to respective GPS satellites. Because GPS requires an unobstructed view to GPS satellites, inclement weather conditions, urban regions, mountainous terrain, or other occlusions often pose challenges to determining the location or position of a vehicle or in implementing vehicle localization.

BRIEF DESCRIPTION

According to one aspect, a system for feature descriptor matching may include a memory, a feature detector, a descriptor extractor, and a descriptor matcher. The memory may receive a first input image and a second input image. The feature detector may detect a first set of features from the first input image and a second set of features from the second input image. The descriptor extractor may learn a first set of local feature descriptors from the first set of features of the first input image and a second set of local feature descriptors from the second set of features of the second input image based on a feature descriptor matching model trained using a ground truth data set including a first ground truth image and a second ground truth image. The descriptor extractor may determine a listwise mean average precision (mAP) rank of a pool of candidate image patches from the second input image with respect to a queried image patch from the first input image based on the feature descriptor matching model, the first set of local feature descriptors, and the second set of local feature descriptors. The descriptor matcher may generate a geometric transformation between the first input image and the second input image based on the listwise mAP and a convolutional neural network (CNN).

The first set of local feature descriptors or the second set of local feature descriptors may include a vector representation of a corresponding image patch. The first set of local feature descriptors or the second set of local feature descriptors may include a binary descriptor or a real-valued descriptor. The descriptor matcher may generate the geometric transformation further based on an amount of computing resources available within the system for feature descriptor match and one of binary descriptors of the first set of local feature descriptors and binary descriptors of the second set of local feature descriptors or real-valued descriptors of the first set of local feature descriptors and real-valued descriptors of the second set of local feature descriptors.

The first ground truth image and the second ground truth image of the ground truth data set may be hard negatives with no matching features. A geometric alignment may be performed on the first ground truth image and the second ground truth image prior to training the feature descriptor matching model using the first ground truth image and the second ground truth image. The geometric alignment may be performed based on a spatial transformer network. The descriptor extractor may perform label mining based on clustering while learning the first set of local feature descriptors or the second set of local feature descriptors. One or more image patches may be clustered based on an inter-cluster distance from other image patches. The feature descriptor matching model or the CNN may be trained based on stochastic gradient descent (SGD).

According to one aspect, a method for feature descriptor matching may include receiving a first input image and a second input image, detecting a first set of features from the first input image and a second set of features from the second input image, learning a first set of local feature descriptors from the first set of features of the first input image and a second set of local feature descriptors from the second set of features of the second input image based on a feature descriptor matching model trained using a ground truth data set including a first ground truth image and a second ground truth image, determining a listwise mean average precision (mAP) rank of a pool of candidate image patches from the second input image with respect to a queried image patch from the first input image based on the feature descriptor matching model, the first set of local feature descriptors, and the second set of local feature descriptors, and generating a geometric transformation between the first input image and the second input image based on the listwise mAP and a convolutional neural network (CNN).

The first set of local feature descriptors or the second set of local feature descriptors may include a binary descriptor or a real-valued descriptor. The method may include generating the geometric transformation further based on an amount of computing resources available within a system for feature descriptor match and one of binary descriptors of the first set of local feature descriptors and binary descriptors of the second set of local feature descriptors or real-valued descriptors of the first set of local feature descriptors and real-valued descriptors of the second set of local feature descriptors. The first ground truth image and the second ground truth image of the ground truth data set may be hard negatives with no matching features. The method may include performing a geometric alignment on the first ground truth image and the second ground truth image prior to training the feature descriptor matching model using the first ground truth image and the second ground truth image. The geometric alignment may be performed based on a spatial transformer network.

According to one aspect, a system for feature descriptor matching may include a memory, a feature detector, a descriptor extractor, and a descriptor matcher. The memory may receive a first input image and a second input image. The feature detector may detect a first set of features from the first input image and a second set of features from the second input image. The descriptor extractor may learn a first set of local feature descriptors from the first set of features of the first input image and a second set of local feature descriptors from the second set of features of the second input image based on a feature descriptor matching model trained using a ground truth data set including a first ground truth image and a second ground truth image. The first set of local feature descriptors and the second set of local feature descriptors may include a binary descriptor or a real-valued descriptor. The descriptor extractor may determine a listwise mean average precision (mAP) rank of a pool of candidate image patches from the second input image with respect to a queried image patch from the first input image based on the feature descriptor matching model, the first set of local feature descriptors, and the second set of local feature descriptors. The descriptor matcher may generate a geometric transformation between the first input image and the second input image based on the listwise mAP and a convolutional neural network (CNN).

The descriptor matcher may generate the geometric transformation further based on an amount of computing resources available within the system for feature descriptor match and one of binary descriptors of the first set of local feature descriptors and binary descriptors of the second set of local feature descriptors or real-valued descriptors of the first set of local feature descriptors and real-valued descriptors of the second set of local feature descriptors. The first ground truth image and the second ground truth image of the ground truth data set may be hard negatives with no match features. The geometric alignment may be performed on the first ground truth image and the second ground truth image prior to training the feature descriptor matching model using the first ground truth image and the second ground truth image.

BRIEF DESCRIPTION OF THE DRAWINGS

FIGS. 10A-10B are illustration of exemplary results of feature descriptor matching according to the systems and methods for feature descriptor matching of FIGS. 1-2.

DETAILED DESCRIPTION

Figure 1:
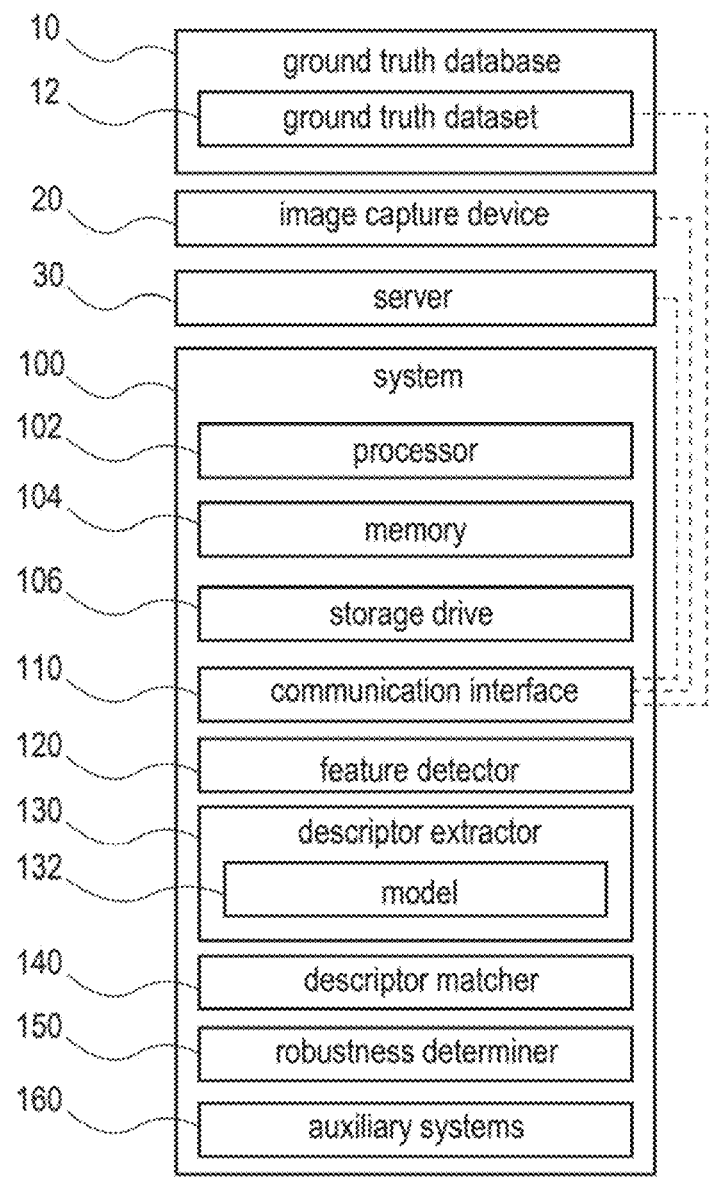
FIG. 1 is an illustration of an exemplary component diagram of a system for feature descriptor neural network training and/or matching.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an illustration of an exemplary component diagram of a system for feature descriptor neural network training and/or matching. The system 100 for feature descriptor neural network training and/or matching may perform image matching between two input images, such as a first input image and a second input image. Applications where image matching, and thus, the system 100 described herein may be applied include 3-D reconstruction of a scene, autonomous driving, vehicle self-localization (e.g., determining the location of the vehicle based on image matching against reference images in a database), and matching a scene from a different time in the past (e.g., associated with different weather conditions, different lighting conditions, etc.) with the scene from the present, etc. As will be described below, the system 100 for feature descriptor neural network training and/or matching may provide quick and efficient matching based on mean average precision of binary or real-valued descriptors.

Ground Truth Dataset

A ground truth database 10 may include or be used to store a ground truth dataset 12. The ground truth dataset 12 may include the first ground truth image and the second ground truth image. Further, the ground truth dataset 12 may include ground truth images and annotations for one or more image patches of the ground truth images. For example, the first ground truth image and the second ground truth image may each include a first image patch corresponding to one another. The first image patch of the first ground truth image and the first image patch of the second ground truth image may be annotated as correlating or as corresponding to one another. However, annotations that a second image patch of the first ground truth image and the first image patch of the second ground truth image may not necessarily exist. These annotations may be utilized to facilitate training of the neural network and the feature descriptor matching model 132.

An image capture device 20 may be mounted on a vehicle, for example, and be used to capture an image, such as an input image. According to another aspect, the image capture device 20 may be the image capture device 20 of a mobile device, which may be mounted in a vehicle or be handheld. A server 30 may house a set of images, such as a reference set of images of a point of interest, for example.

The system 100 for feature descriptor neural network training and/or matching may include a processor 102, a memory 104, a storage drive 106, a communication interface 110, a feature detector 120, and a descriptor extractor 130. The descriptor extractor 130 may utilize a neural network associated with a model 132 to facilitate descriptor extraction. The system 100 for feature descriptor neural network training and/or matching may include a descriptor matcher 140, a robustness determiner 150, and one or more auxiliary systems 160.

The memory 104 may receive a first input image and a second input image via the communication interface 110. The storage drive 106 may be utilized to store the first input image and the second input image. Additionally, the storage drive 106 may be utilized to store the trained neural network and/or a feature descriptor matching model. The feature descriptor matching model 132 may be trained based on stochastic gradient descent (SGD) and may include one or more parameters associated with the neural network. These parameters may be optimized during a training phase or a learning phase.

Feature Detection

The feature detector 120 may detect a first set of features from the first input image and a second set of features from the second input image. Features, for example, may be four corners of a square. According to one aspect, features may be identified by applying a filter to the input image, and pixels which exceed a threshold response amount may be considered to be feature pixels, and image patches may be selected based on these pixels. However, it should be noted that a feature may be defined by a single pixel, a line of pixels, or an area of pixels as the image patch. For example, a feature may be defined by an x-coordinate, a y-coordinate, a location, a scale (e.g., a size of an associated image patch). In this way, different image patches may be different sizes. Therefore, the feature detector 120 may automatically determine a size of an image patch associated with a detected feature.

Descriptor Extraction

Figure 4:
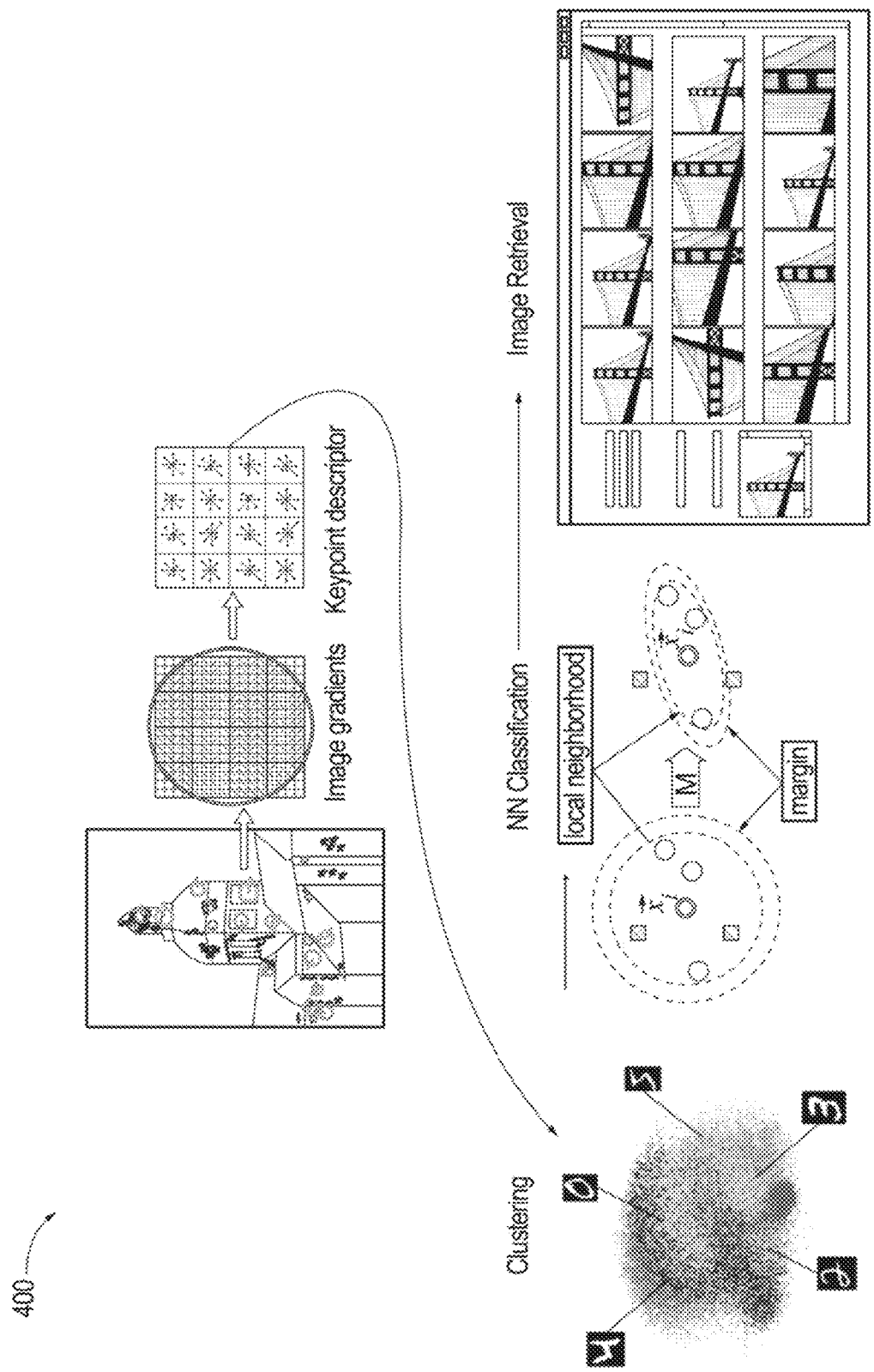
FIG. 4 is an illustration of an exemplary implementation of feature descriptor matching according to the systems and methods for feature descriptor matching of FIGS. 1-2.

The descriptor extractor 130 may learn a first set of local feature descriptors from the first set of features of the first input image and learn a second set of local feature descriptors from the second set of features of the second input image based on the feature descriptor matching model 132 (e.g., stored on the storage drive 106) trained using the ground truth data set. The features of the first set of features and the second set of features may be provided to the descriptor extractor 130 as image patches, which are areas of pixels within the respective first input image and the second input image. Each image patch may be subdivided into one or more cells, and for each cell, the descriptor extractor 130 may determine histogram data of image gradients, using the histogram data of the image gradients, the descriptor extractor 130 may assemble the vector representation information for respective image patches as descriptor vectors or keypoint descriptors. An example of this is shown at FIG. 4.

As previously discussed, the ground truth dataset 12 may include the first ground truth image and the second ground truth image. The first set of local feature descriptors or the second set of local feature descriptors may include a vector representation of a corresponding image patch. In other words, the descriptor extractor 130 may compute these first and second set of local feature descriptors as vector representations for corresponding image patches. Feature descriptors may include an image gradient or a keypoint descriptor.

Explained another way, the descriptor extractor 130 may select a subset of locations or areas (e.g., image patches) from each input image (e.g., the first input image and the second input image) to extract the respective local feature descriptors (e.g., the first set of local feature descriptors and the second set of local feature descriptors). Selection of this subset may be based on criterion associated with the uniqueness and stability of respective locations or positions (e.g., corners, change of angle, change of color across gradients, color detection, shape detection, blob detection, edge detection, etc.). In other words, for a given input image, an image patch may be selected for feature detection by the feature detector 120 such that given another viewpoint or another lighting condition, this same image patch, when viewed differently, is readily identifiable. In this way, pixels around this location (i.e., the corresponding image patch) may be selected and transformed into the local feature descriptors, which may be represented in vector format.

Additionally, the descriptor extractor 130 may determine a listwise mean average precision (mAP) rank of a pool of candidate image patches from the second input image with respect to a queried image patch from the first input image based on the feature descriptor matching model 132, the first set of local feature descriptors, and the second set of local feature descriptors.

The local feature descriptors may be of different types (e.g., a first type, a second type, binary, real-valued, etc.), such as a binary descriptor or a real-valued descriptor. In other words, the first set of local feature descriptors or the second set of local feature descriptors may be the binary descriptor or the real-valued descriptor. Using these local feature descriptors, patch retrieval may be performed by the descriptor matcher 140. As previously discussed, the local feature descriptors may be applied to image patches, rather than an entire input image (i.e., the first image and the second input image). In this way, image patches, which are sections of the respective input images may be mapped through the neural network to output a binary representation. Similarly, image patches, which are sections of the respective input images may be mapped through the neural network to output a real-valued representation.

For the real-valued descriptors, a threshold operation may not be performed. For example, with respect to the binary descriptors, the threshold operation may be performed so that the output representation vector is either one or zero (i.e., any output above the pre-defined threshold results in one, while everything else results in zero). Therefore, after the image patch from one of the input images is pathed through any number of convolutional layers or layers of the CNN and a fully connected layer, the output may be 128 numbers (or another amount of numbers), for example. Following the above example, to obtain binary descriptors, the descriptor extractor 130 may threshold those numbers at zero. In other words, anything above zero may be set to one, while everything else is set to zero. For real-valued descriptors, no threshold operation is performed.

The descriptor extractor 130 may perform label mining based on clustering while learning the first set of local feature descriptors or the second set of local feature descriptors. One or more image patches may be clustered based on an inter-cluster distance from other image patches. According to one aspect, clustering of two or more image patches from an input image based on a K-means sequence and defining negatives for in-sequence negative mining based on an inter-cluster distance between two clustered patches may be performed. Because ground truth annotations may not necessarily be provided for every image patch within the first ground truth image and the second ground truth image (e.g., in the sense that the ground truth dataset 12 may not necessarily include all positive or all negative annotations or correspondence from every image patch to every other image patch), within the same image sequence or pair, the relationships for any two patches may be determined or estimated. Explained yet again, because some of the image patches from the ground truth dataset 12 are not annotated, it may be desirable to train the neural network off of these. Using label mining, inferences may be made (e.g., by the processor 102) as to whether these patches do match or don't match.

Descriptor Matching

The descriptor matcher 140 may determine a match between the first input image and the second input image and generate a geometric transformation between the first input image and the second input image based on the listwise mAP and a convolutional neural network (CNN) as a result thereof. The matching performed by the descriptor matching may be a geometric operation. The descriptor matcher 140 may select between matching aspects of the first input image and the second input image using either the binary descriptors or the real-valued descriptors. For example, the descriptor matcher 140 may generate the geometric transformation further based on an amount of computing resources available within the system 100 for feature descriptor matching and one of binary descriptors of the first set of local feature descriptors and binary descriptors of the second set of local feature descriptors or real-valued descriptors of the first set of local feature descriptors and real-valued descriptors of the second set of local feature descriptors. Stated another way, the descriptor matcher 140 may query the pool of image patches and calculate the mAP for image patches of the input image associated with the descriptors.

According to one aspect, the descriptor matcher 140 may generate a fundamental matrix F. The fundamental matrix F may describe the relationship or the geometric relationship, between two dimensions (i.e., the position associated with the first input image and the position associated with the second input image). In other words, if the transformation associated with the fundamental matrix F is applied to the first input image, the second input image is the result. Stated yet another way, applying the fundamental matrix F to the first input image of I may enable transformation, in a point-to-point fashion of one or more of the pixels, image patches, or points of the first input image to the second input image. In this way, dense correspondence may be provided by the system 100 for feature descriptor matching and/or training. Thus, given the pair of input images I (e.g., the first input image and the second input image), point to point correspondence may be established and over pixels, image patches, or points in these two images I.

In this regard, binary descriptor related computations utilize far less computing power than the real-valued descriptors, and are thus, capable of provided faster matching and/or faster geometric transformations or fundamental matrix F calculations. However, real-valued descriptors may be desirable because the real-valued descriptors may provide more accurate geometric transformations or fundamental matrix F calculations. In other words, there may be a performance versus speed tradeoff between the two different types of descriptors.

According to one aspect, the matching via the descriptor matcher 140 may be achieved by performing nearest neighbor retrieval. Each feature in $I_1$ may be utilized to query a database from the server 30, which is the set of features in $I_2$. As previously discussed, true matches should be returned as top retrievals, while false, non-matches are ranked as low as possible. The performance of matching may directly reflect the quality of the learned descriptors, since the matching stage or phase has no learnable parameters (e.g., the descriptor matcher 140 performs distance computation and sorting). To assess nearest neighbor matching performance, mAP may be utilized. Thus, the descriptor matcher 140 may utilize mAP to evaluate the performance of retrieval systems under a binary relevance assumption (e.g., retrievals are either "relevant" or "irrelevant" to the query). This naturally fits the local feature matching setup, where given a reference feature, features in a target image are either the true match or a false, non-match. In this way, the descriptor extractor 130 may learn binary and real-valued local feature descriptors to optimize mAP.

Optimizing Average Precision

Let X be the space of image patches, and $S \subset X$ be a database. For a query patch $q \in X$, let $S_q^+$ be the set of its matching patches in S, and let $S_q^-$ be the set of non-matching patches. Given a distance metric D, let $(x_1, x_2, \ldots, x_n)$ be a ranking of items in $S_q^+ \cup S_q^-$ sorted by increasing distance to q, i.e. $D(x_1, q) \leq D(x_2, q) \ldots \leq D(x_n, q)$. Given the ranking, AP is the average of precision values (Prec@K) evaluated at different positions:

$$Prec@K = \frac{1}{K}\sum_{i=1}^{K} 1[x_i \in S_q^+] \quad (1)$$

$$AP = \frac{1}{|S_q^+|}\sum_{k=1}^{n} 1[x_K \in S_q^+]Prec@K \quad (2)$$

Where 1 [•] is the binary indicator. AP achieves its optimal value if and only if every patch from $S_q^+$ is ranked above all patches from $S_q^-$.

Optimization of AP may be viewed as a metric learning problem, where the goal is to learn a distance metric that gives optimal AP when used for retrieval. Ideally, if the above can be formulated in differentiable forms, then AP can be optimized by exploiting the chain rule. However, this is not generally possible because the sorting operation, required in producing the ranking, is non-differentiable, and continuous changes in the input distances induce discontinuous "jumps" in the value of AP. Thus, appropriate smoothing may be utilized to derive differentiable approximations of AP. For learning binary image-level descriptors for image retrieval, sorting on integer-valued Hamming distances may be implemented as histogram binning, and a differentiable approximation employed to histogram binning to optimize ranking-based objectives with gradient descent. This optimization framework may optimize AP for both binary and real-valued local feature descriptors. In the latter case, for the real-valued local feature descriptors, the optimization may be enabled by a quantization-based approximation.

Binary Descriptors

Binary descriptors offer compact storage and fast matching, which are useful in applications with speed or storage restrictions. Although binary descriptors can be learned one bit at a time, a gradient-based relaxation approach may be utilized to learn fixed-length "hash codes". Formally, a deep neural network F is used to model a mapping from patches to a low-dimensional Hamming space: $F: X \to \{-1, 1\}^b$. For the Hamming distance D, which takes integer values in $\{0, 1, \ldots, b\}$, AP may be computed in closed form using entries of a histogram $h^+=(h_0^+, \ldots, h_b^+)$, where $h_k^+ = \Sigma z \in S_q^+ 1[D(q,x)=k]$. The closed-form AP may be further continuously relaxed, and differentiated with respect to $h^+$.

Proceeding with chain rule, the processor 102 may differentiate entries of $h^+$ with respect to the network F. The histogram binning operation may be approximated as:

$$h_k^+ \approx \Sigma_{x \in S_q^+} \delta(D(q,x),k), \quad (3)$$

replacing the binary indicator with a differentiable function $\delta$ that peaks when $D(q, x)=k$. This allows to derive approximate gradients as:

$$\frac{\partial h_k^+}{\partial F(q)} \approx \sum_{x \in S_q^+} \frac{\partial \delta(D(q, x), k)}{\partial D(q, x)} \frac{\partial D(q, x)}{\partial F(q)} \quad (4)$$

$$\frac{\partial h_k^+}{\partial F(x)} \approx 1[x \in S_q^+] \frac{\partial \delta(D(q, x), k)}{\partial D(q, x)} \frac{\partial D(q, x)}{\partial F(q)} \quad (5)$$

The partial derivative of the hamming distance may be obtained via differentiable formulation:

$$D(x,x') = \frac{1}{2}(b - F(x)^T F(x')). \quad (6)$$

Additionally, the thresholding operation used to produce binary bits may be smoothed using the tan h function:

$$F(x) = (\text{sgn}(F_1(x)), \ldots, \text{sgn}(f_b(x))) \quad (7)$$

$$\approx (\tanh(f_1(x)), \ldots, \tanh(f_b(x))), \quad (8)$$

Where $f_i$ are real-valued neural network activations. With these relaxations, the neural network may be trained end-to-end.

Real-Valued Descriptors

For real-valued descriptors, which may be utilized in high-precision scenarios, the descriptor may be modeled as a vector of real-valued network activations, and apply $L_2$ normalization $|F(x)|=1$, $\forall x$. In this case, the Euclidean distance is given as:

$$D(x,x') = \sqrt{2 - 2F(x)^T F(x')}.$$

The main challenge in optimizing AP for real-valued descriptors is the non-differentiable sorting, but real-valued sorting has no simple alternative form. However, histogram binning may be used as an approximation. For example, quantize real-valued distances using histogram binning, obtain the histograms h+, and then reduce the optimization problem to the previous one. With $L_2$-normalized vectors, the quantization may be implemented as the Euclidean distance has a closed range [0,2]. Therefore, the system may uniformly divide [0,2] into b+1 bins. To derive the chain rules, only the partial derivatives of the distance function needs modification in equations (4) and (5). The differentiation rules for the $L_2$ normalization operation may be derived.

Differently than the binary descriptors, the number of histogram bins b is now a free parameter, which involves a tradeoff. On the one hand, a large b reduces quantization error, which may be achieved as zero if each histogram bin contains at most one item. On the other hand, gradient computation for approximate histogram binning may have linear complexity in b. Based on experiments, acceptable results are obtained using b 25, which means that the real-valued descriptors may be faster to train than binary ones (≥10× speedup compared to 256-bit descriptors).

Geometric Alignment

According to one aspect, a geometric alignment may be performed on the first ground truth image and the second ground truth image prior to training the feature descriptor matching model 132 using the first ground truth image and the second ground truth image of the ground truth dataset 12. A spatial transformer network may be utilized to perform the geometric alignment on the first ground truth image and the second ground truth image. For example, the geometric alignment may include rectification of the first ground truth image and the second ground truth image. Additionally, the processor 102 may perform the geometric alignment on the first input image and the second input image prior to feature detection by the feature detector 120, prior to descriptor extraction, or during the feature or descriptor extraction as part of the method or process. In this way, robustness may be provided because the geometric alignment or rectification may mitigate noise within the input images. Further, the processor 102 may perform other types of image processing (e.g., accounting for lighting variation) prior to or during the aforementioned feature detection or descriptor extraction.

The robustness determiner 150 may estimate a parametric of the matching from the descriptor matcher 140. This parametric may be indicative of a quality of the match between the first input image and the second input image.

The processor 102 may control one or more of the auxiliary systems 160 or vehicle systems to activate or deactivate based on the estimated location from the localization, for example. In other words, if the first input image is from the image capture device 20 (e.g., mounted on a vehicle) or from the image capture device 20 from a mobile device inside the vehicle, and the second image is from the server 30 which houses the reference set of images associated with a known location, the descriptor matcher 140 may generate or calculate the geometric transformation between the first input image and the second input image, thereby providing the location or the position of the vehicle. Using this position or location information, the processor 102 may enable a lane keep assist system of the auxiliary systems 160 when it is determined that the vehicle is within a lane and starting to drift into another lane, for example. Other vehicle systems, including the vehicle systems described above (e.g., cruise control system, a lane departure warning system, a blind spot indicator system, a lane keep assist system, a navigation system, etc.), may be controlled by the processor 102 based on the localization provided by the system or method for feature descriptor neural network matching described herein.

Figure 2:
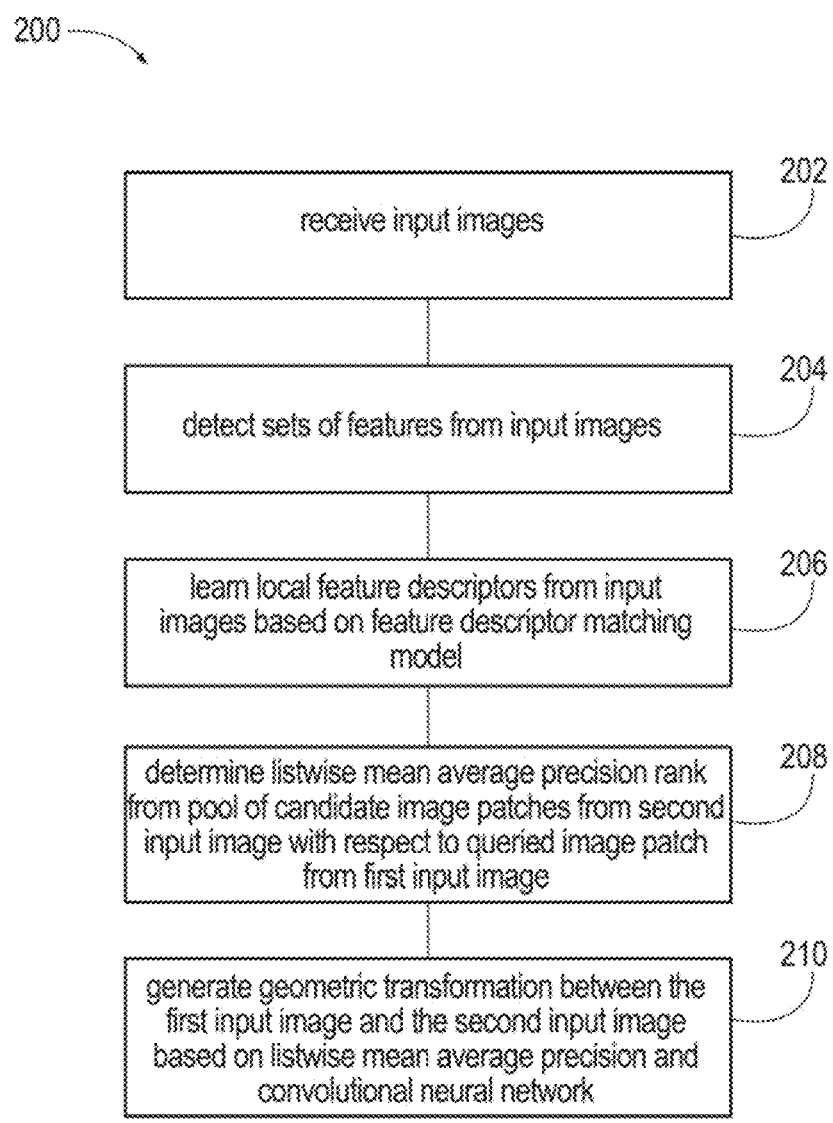
FIG. 2 is an illustration of an exemplary flow diagram of a method for feature descriptor neural network training and/or matching.

FIG. 2 is an illustration of an exemplary flow diagram of a method for feature descriptor neural network training and/or matching. According to one aspect, the method for feature descriptor matching may include receiving 202 a first input image and a second input image, detecting 204 a first set of features from the first input image and a second set of features from the second input image, learning 206 a first set of local feature descriptors from the first set of features of the first input image and a second set of local feature descriptors from the second set of features of the second input image based on a feature descriptor matching model trained using a ground truth data set including a first ground truth image and a second ground truth image, determining 208 a listwise mean average precision (mAP) rank of a pool of candidate image patches from the second input image with respect to a queried image patch from the first input image based on the feature descriptor matching model 132, the first set of local feature descriptors, and the second set of local feature descriptors, and generating 210 a geometric transformation between the first input image and the second input image based on the listwise mAP and a convolutional neural network (CNN).

Figure 3:
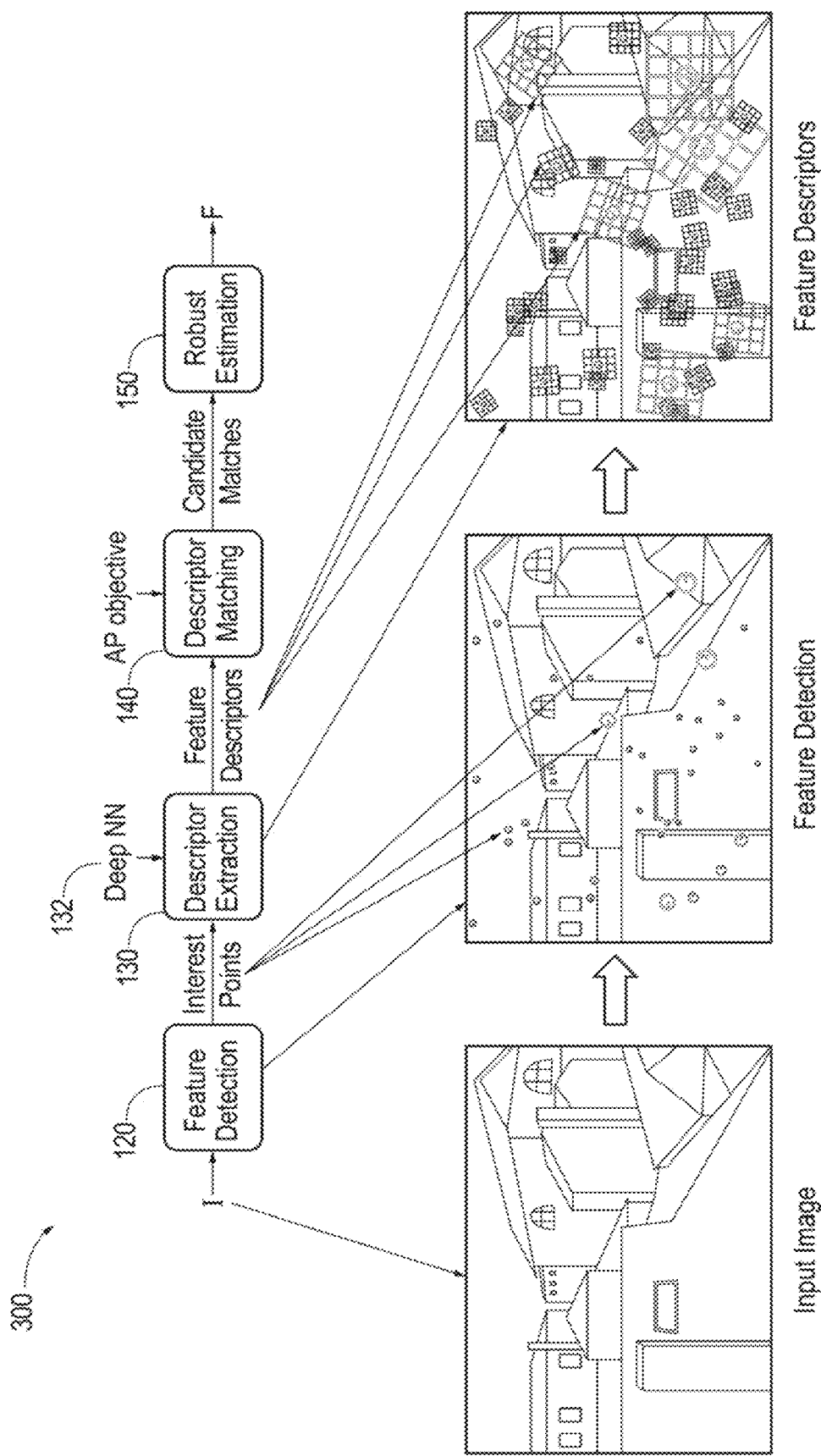
FIG. 3 is an illustration of an exemplary implementation of feature descriptor neural network training and/or matching according to the systems and methods for feature descriptor neural network training and/or matching of FIGS. 1-2.

FIG. 3 is an illustration of an exemplary implementation 300 of feature descriptor neural network training and/or matching according to the systems and methods for feature descriptor neural network training and/or matching of FIGS. 1-2. As seen in FIG. 3, I is an input to the feature detector 120. Here, I may include the first input image and the second input image. As an example, the first input image may be received from the image capture device 20, transmitted to the communication interface 110, and received at the memory 104 or storage drive of the system 100 for feature descriptor matching. In this exemplary scenario, the second input image may be received from the server 30, transmitted to the communication interface 110, and received at the memory 104 or storage drive. Here, the first input image may be captured in real time, and at a location where localization is desired. The second input image may be from the server 30, which may house a maps database, and include an associated known location (e.g., similarly to a map or computer program, a web mapping server which maps earth based on imagery and may include street maps or panoramic views from the perspective of a pedestrian or vehicle).

Features may be detected by the feature detector 120. These features, such as the first set of features from the first input image and the second set of features from the second input image, may be fed to the descriptor extractor 130, which may learn the first set of local feature descriptors from the first set of features of the first input image and the second set of local feature descriptors from the second set of features of the second input image based on the feature descriptor matching model 132.

Once these feature descriptors are learned or extracted, the descriptor matcher 140 may determine a match between the first input image to the second input image based on the listwise mAP of ranked pools of candidate image patches against a queried image patch. Each image patch may be associated with its own set of local feature descriptors. When a match exists between the first input image to the second input image, the descriptor matcher 140 may calculate the geometric transformation between the first input image and the second input image based on the listwise mAP and the CNN because the matching is generally a geometric operation.

FIG. 4 is an illustration of an exemplary implementation 400 of feature descriptor matching according to the systems and methods for feature descriptor matching of FIGS. 1-2. In FIG. 4, feature descriptor matching and image retrieval is generally shown. Features may be extracted, followed by descriptor extraction, then by clustering, neural network classification via the feature descriptor matching model 132, and image retrieval and/or matching thereafter.

Figure 5:
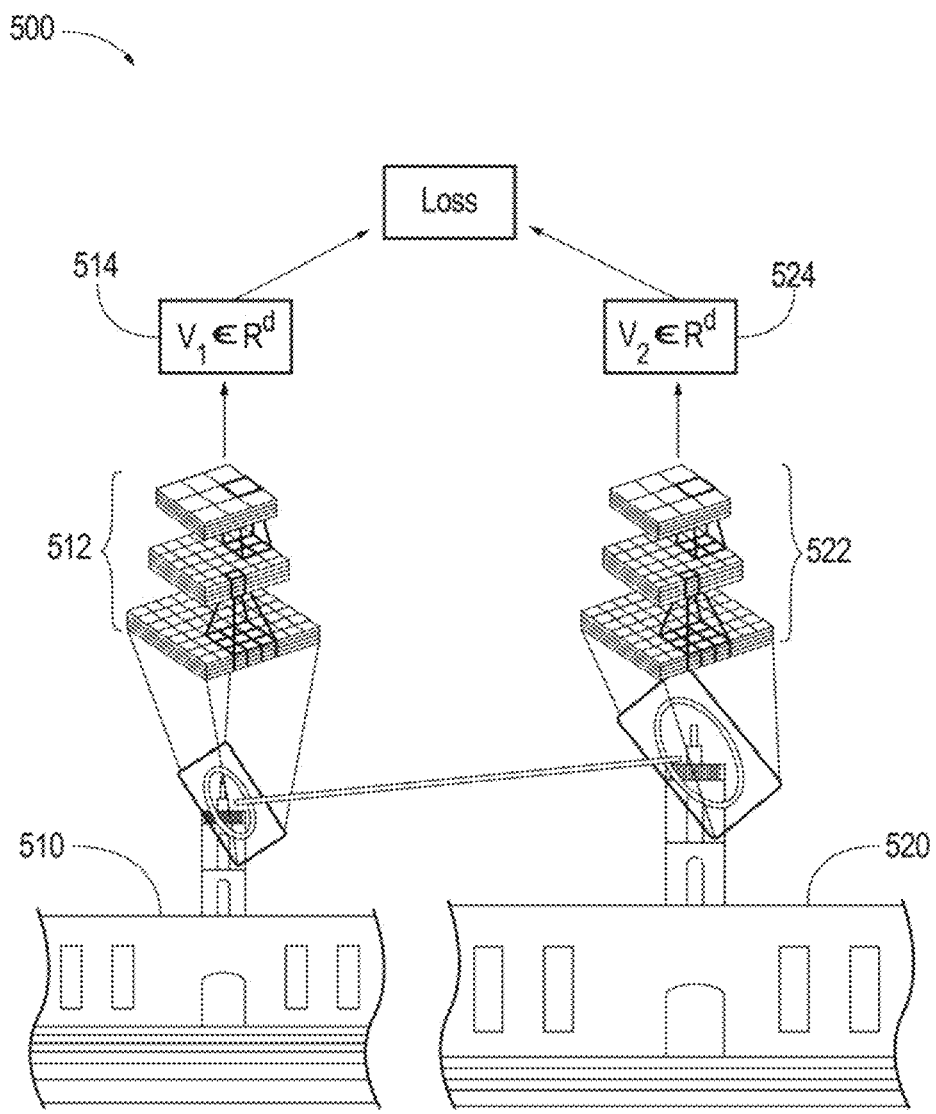
FIG. 5 is an illustration of an exemplary implementation of feature descriptor matching according to the systems and methods for feature descriptor matching of FIGS. 1-2.

FIG. 5 is an illustration of an exemplary implementation 500 of feature descriptor matching according to the systems and methods for feature descriptor matching of FIGS. 1-2.

FIG. 5 may be viewed with respect to different aspects of the feature descriptor matching. According to one aspect, FIG. 5 may relate to feature descriptor neural network training of the feature descriptor matching model 132. According to another aspect, FIG. 5 may relate to feature descriptor matching using the trained feature descriptor neural network and the trained feature descriptor matching model.

In FIG. 5, exemplary first input image 510 and second input image 520 are provided. Each one of the first input image and the second input image are passed through multiple layers of operations of a CNN at 512 and 522, respectively. Examples of these operation layers may include convolution, down-sampling, etc. Finally, the output (514, 524) of $v_1$ and $v_2$ as feature descriptor vectors may be seen. $v_1$ and $v_2$ may represent the feature descriptor vectors computed from the process, and correspond to image patches from the exemplary first input image 510 and second input image 520, respectively. With respect to the $v_1 \in R^d$ and $v_2 \in R^d$ of FIG. 5, d may, for example d=128.

As seen in FIG. 5, many layers of neural networks are shown, and may include convolutional layers, fully connected layers, layers for down-sampling, etc. A convolutional layer itself may be utilized to perform some down-sampling in the sense that the dimensionality of the output may be reduced from one layer to the next. For example, a first convolutional layer may accept or receive image patches which are 32×32. The first convolutional layer may be 3×3×32, which means the convolution kernel has size 3×3 and that there are 32 filters or kernels. Other convolutional layers may include additional parameters, such as stride, padding, filters, etc. In any event, the CNN may be configured so that as the image patch is fed further along layers of the CNN, the spatial resolution is reduced, while the feature dimensionality increases. For example, when the input is a 32×32 gray scale image patch, the feature dimension is one because there is merely a single channel (i.e., the gray scale color channel). In this regard, with additional convolutional layers, 32 channels, 64 channels, 128 channels, etc. may be possible for the feature dimensionality. Conversely, the convolutional layers also reduce the spatial resolution in a concurrent manner as the image patch is passed or processed from layer to layer. For example, from 32×32 to 16×16 . . . , and eventually to 1×1. In this regard, an output vector or feature descriptor vector may be 1×1×128.

The loss function (e.g., by minimizing the loss function such as during training using the ground truth dataset 12) may be utilized to train the neural network. For example, during training, a pair of corresponding image patches may be received (i.e., one from each of the first ground truth image and the second ground truth image). Because the ground truth dataset 12 includes images and annotations for one or more image patches, these annotations may be utilized to facilitate training of the neural network and the feature descriptor matching model 132. In this regard, the loss function for two corresponding image patches from the pair of the first ground truth image and the second ground truth image should effectively be zero. Otherwise, if these two image patches do not correspond to the same point in the environment, the loss function may result in the two vectors being different by some amount. During training, multiple image patch pairs may be sampled from the first ground truth image and the second ground truth image, thereby providing a sufficient gradient signal to train the neural network and corresponding feature descriptor matching model.

It shall be appreciated that the loss function may be generalized. In other words, the system 100 for feature descriptor matching and/or training may generalize the loss defined on pairs of image patches. Explained yet again, this means that the system 100 for feature descriptor matching and/or training may analyze the loss that is defined on an entire list of patches, not necessarily merely two image patches. In this way, if there is a patch from the first input image and it is known that somewhere in the second input image there is one patch that is the corresponding image patch, the ground truth annotations of the ground truth dataset 12 may be indicative of this correspondence or match. However, in training, the feature descriptor matching model 132 and corresponding neural network may be built or trained so that distractors may be included among the pool of potential candidates. In other words, these distractors may be randomly sampled (e.g., from neighboring image patches known to not be matches) and used to facilitate teaching of the neural network and corresponding feature descriptor matching model (i.e., the annotations may be utilized to facilitate teaching of positive matches and to help identify negatives which are known to be negatives during training to teach the neural network and corresponding feature descriptor matching model to identify negatives in addition to the positives).

Further mAP may be utilized to facilitate ranking of the pool of candidate image patches against the image patch which is the queried image patch. Similarly, the ground truth database 10 may be utilized to facilitate the training of the ranking so that the correct match 'floats' to the top of the ranked list (i.e., matches be directed to be in front of the non-matches within the list). An example of this may be seen with reference to FIGS. 6-7.

Figure 6:
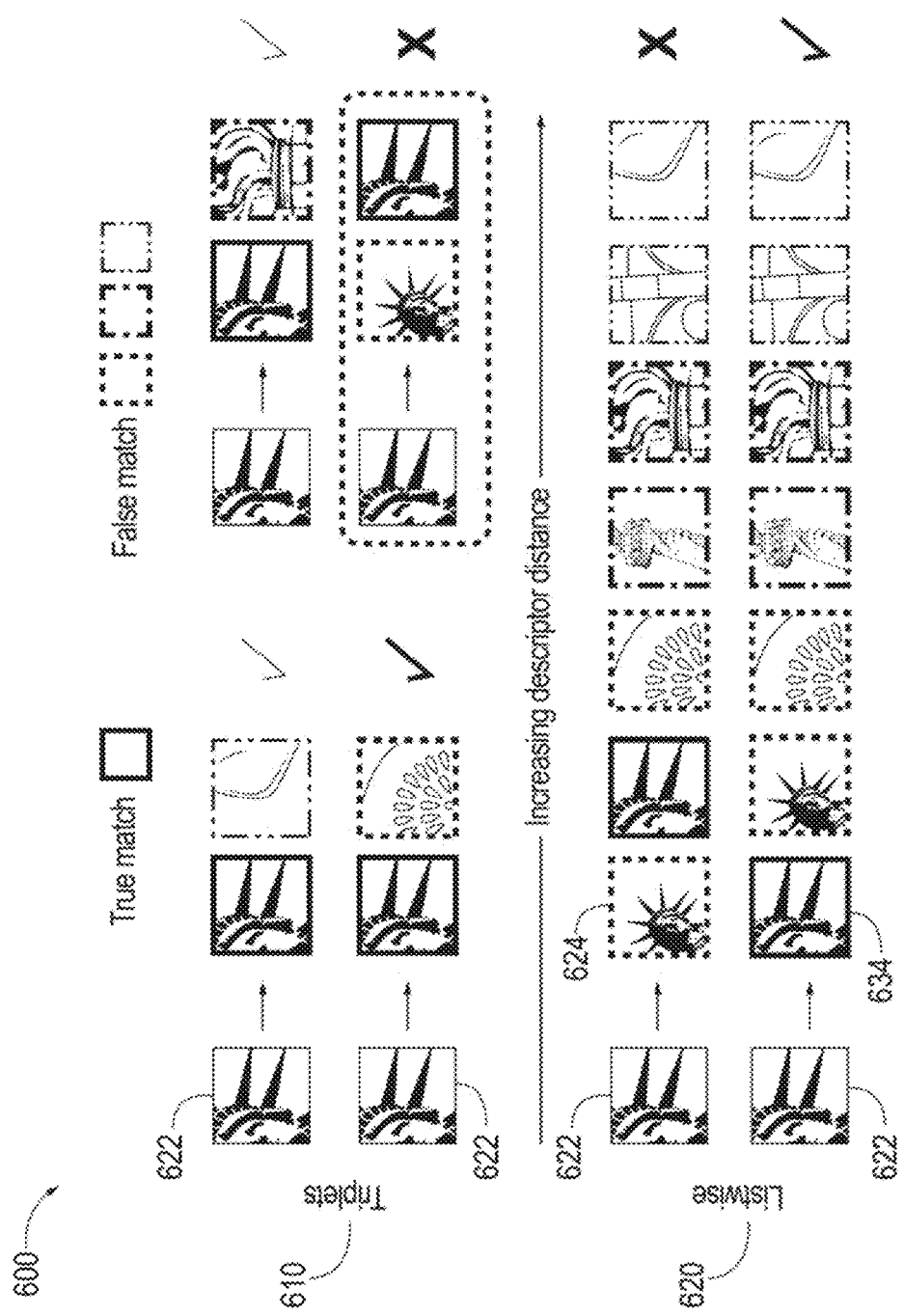
FIGS. 6-7 are illustrations of an exemplary implementation of feature descriptor matching according to the systems and methods for feature descriptor matching of FIGS. 1-2.
Figure 7:
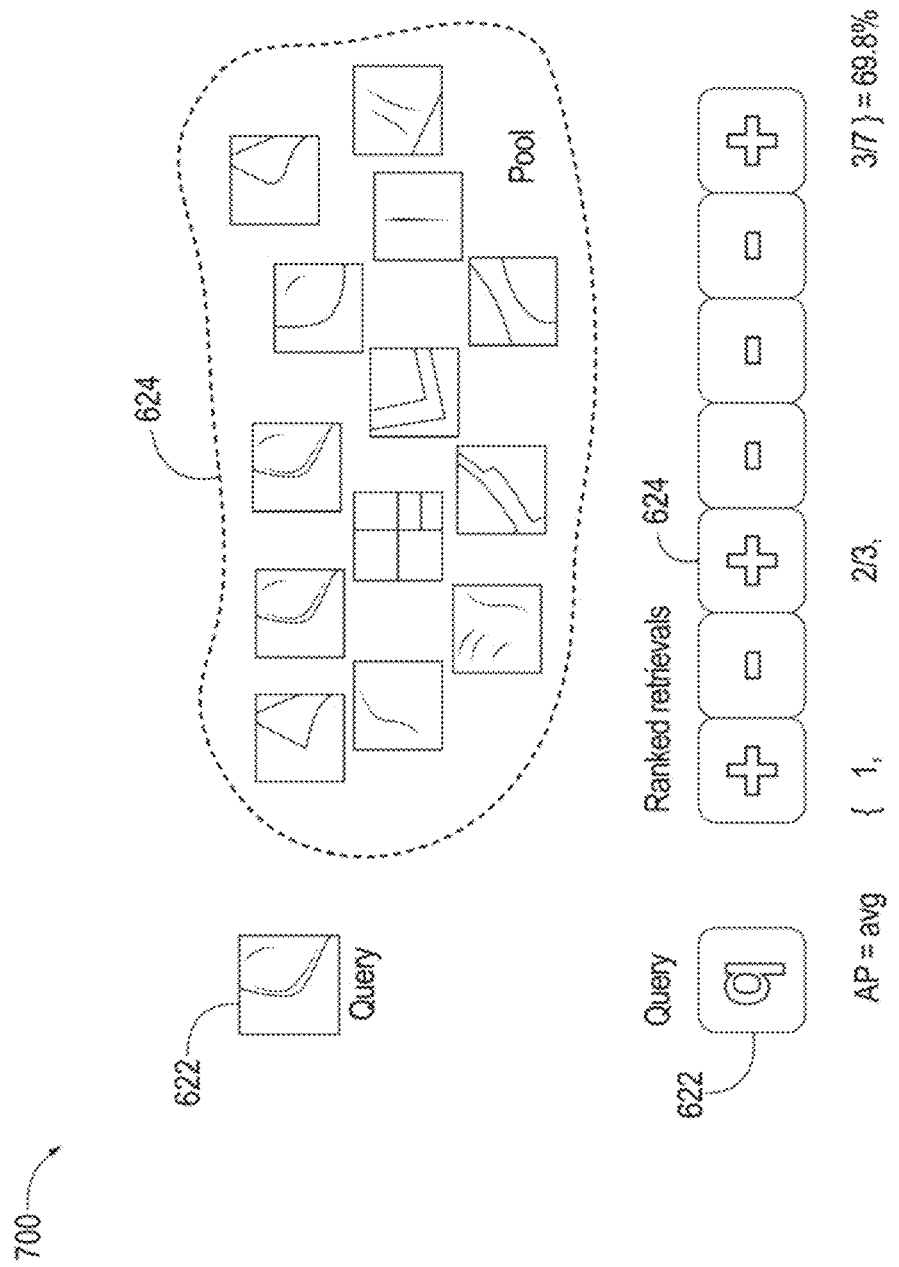

FIGS. 6-7 are illustrations of an exemplary implementations 600 and 700 of feature descriptor matching according to the systems and methods for feature descriptor matching of FIGS. 1-2. At 610 patches may be matched according to triplets methodology, while at 620, matching may be performed by the descriptor matcher 140 using mAP. For example, the query image patch Q may be represented at 622, and the pool of candidate image patches at 624. According to one aspect, a size of the pool of candidate image patches 624 may be greater than two or based on descriptor distance. Because the size of the pool of candidate image patches 624 may be greater than two, the feature descriptor matching model 132 may be trained more accurately. As seen within the pool of candidate image patches 624, merely a single true match exists, while multiple false matches or negatives are also within the pool of candidate image patches 624.

After mAP is performed across multiple iterations of training, the result of the query image patch Q may be the mean mAP ranked list 634 from the pool of candidate image patches 624. From the mean mAP ranked list 634, it can be seen that the respective image patches are now sorted in an ascending order beginning with the true match, and further by descriptor distance (e.g., from left to right) or by closeness of match (e.g., match percentage). In this way, mAP may be utilized by the descriptor extractor 130 to rank image patches from the pool of candidate image patches 624. According to one aspect, mAP may use a computed mean over many different queries (e.g., image patches). In other words, the query may be repeated and the pool of candidate image patches 624 may be varied or different queries may be executed during training to provide an appropriate cross-section for learning.

According to one aspect, negatives, negative matches, or non-matches may be inserted into the pool of candidate image patches 624 during the training phase. In this way, the feature descriptor matching model 132 trained using the ground truth data set may be trained to identify negatives, negative matches, or non-matches. For example, the first ground truth image and the second ground truth image of the ground truth data set may be hard negatives with no matching features. In other words, hard negatives may be non-matches as annotated from the ground truth perspective, but similar in terms of virile appearance. In this way, training of the feature descriptor matching model 132 and neural network may occur for both positive and negative matches, rather than relying on random sampling to achieve learning or training of the feature descriptor matching model 132 and neural network. In this way, the performance of the feature descriptor matching model 132 and neural network may be better, and training time and/or resources may be reduced.

According to another aspect, random image patches may be inserted into the pool of candidate image patches 624 during the training phase. According to yet another aspect, image patches may be inserted into the pool of candidate image patches 624 during the training phase based on rules, heuristics, etc.

Figure 8:
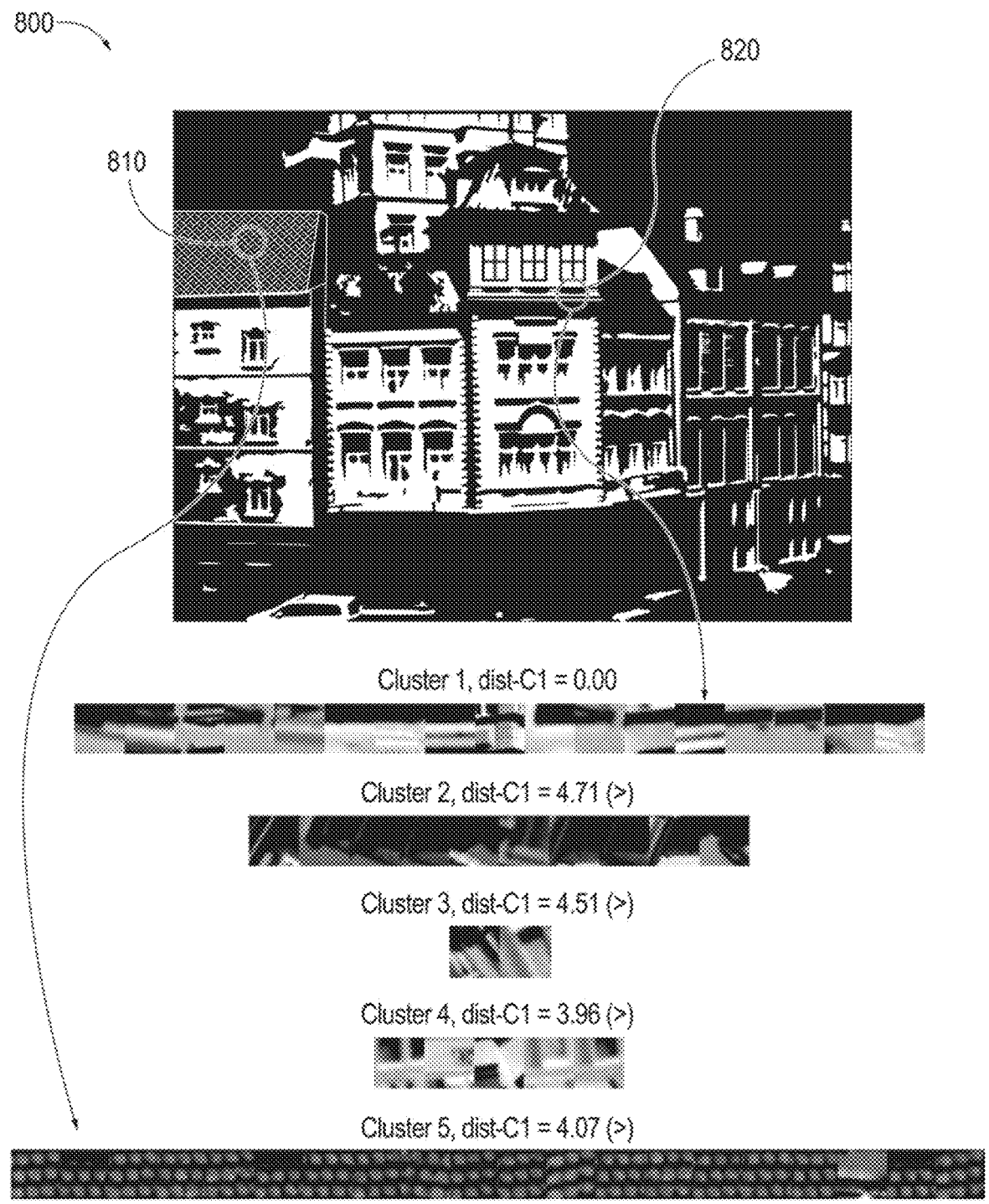
FIG. 8 is an illustration of an exemplary implementation of feature descriptor neural network training according to the systems and methods for feature descriptor neural network training of FIGS. 1-2.

FIG. 8 is an illustration of an exemplary implementation 800 of feature descriptor neural network training according to the systems and methods for feature descriptor neural network training of FIGS. 1-2. An example of clustering is shown in FIG. 8, and negative matches produced at 810 and 820.

Figure 9:
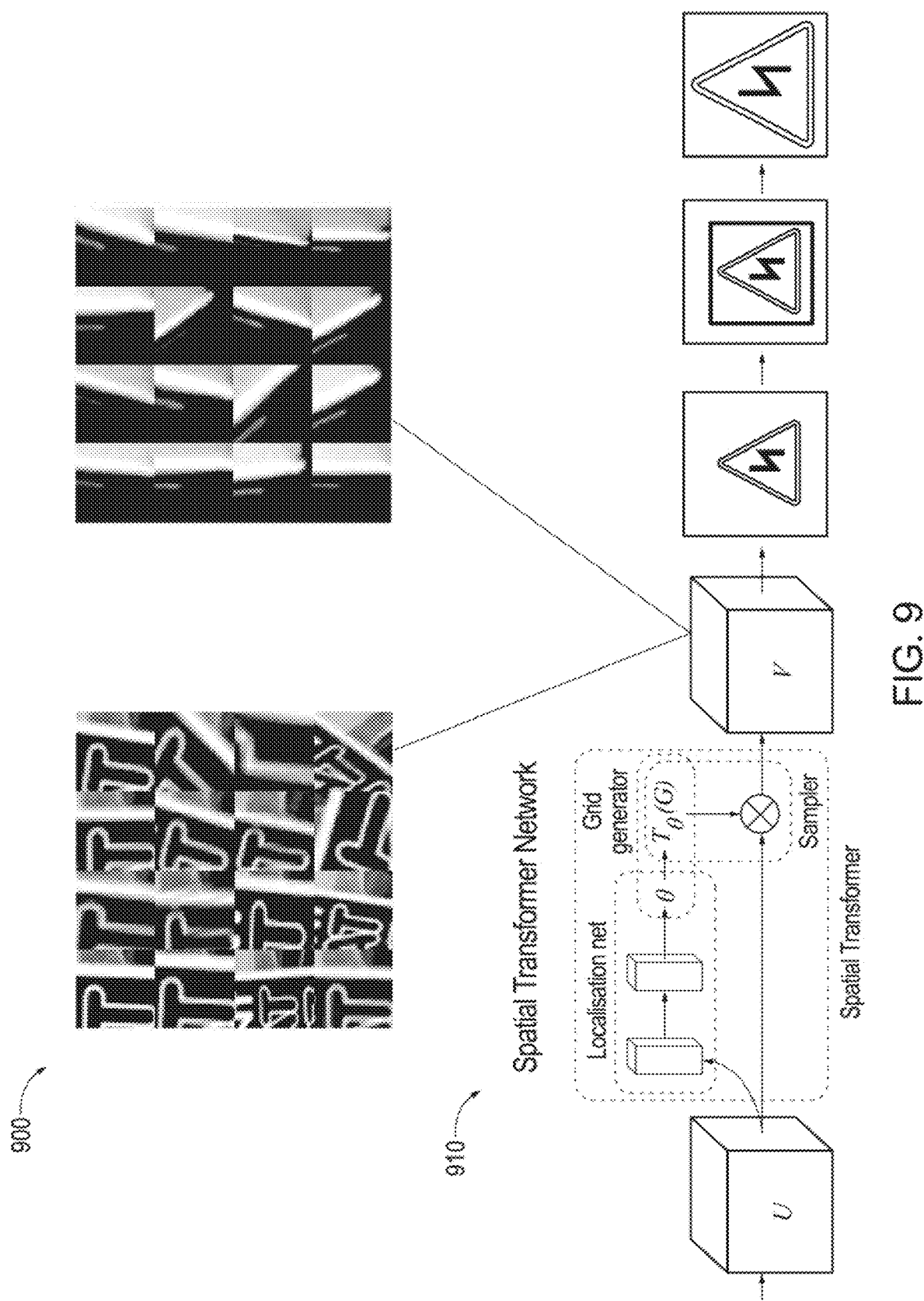
FIG. 9 is an illustration of an exemplary implementation of feature descriptor neural network training according to the systems and methods for feature descriptor neural network training of FIGS. 1-2.

FIG. 9 is an illustration of an exemplary implementation 900 of feature descriptor neural network training according to the systems and methods for feature descriptor neural network training of FIGS. 1-2. Graphic examples of geometric alignment including rectification via a spatial transformer network 910 may be seen in FIG. 9. These geometrically aligned image patches may be fed as the input to the feature detector 120 or the descriptor extractor 130 of the system 100 for feature descriptor matching and/or the system 100 for feature descriptor neural network training.

FIGS. 10A-10B are illustrations 1000 of exemplary results of feature descriptor matching according to the systems and methods for feature descriptor matching of FIGS. 1-2. For example, the left images may represent a first input image taken at a first time, while the right images may represent a second input image taken at a second time, while the lines between the images illustrate the correspondence determined on a point-to-point basis.

Still another aspect involves a computer-readable medium including processor-executable instructions configured to implement one aspect of the techniques presented herein. An aspect of a computer-readable medium or a computer-readable device devised in these ways includes a computer-readable medium, such as a CD-R, DVD-R, flash drive, a platter of a hard disk drive, among others, on which is encoded computer-readable data. This encoded computer-readable data, such as binary data including a plurality of zero's and one's, in turn includes a set of processor-executable computer instructions configured to operate according to one or more of the principles set forth herein. In this implementation, the processor-executable computer instructions may be configured to perform a method, such as the method 200 of FIG. 2. In another aspect, the processor-executable computer instructions may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. Both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The following discussion provides a description of a suitable computing environment to implement aspects of one or more of the provisions set forth herein. The operating environment described is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

A system may include a computing device configured to implement one aspect provided herein. In one configuration, the computing device includes at least one processing unit and memory. Depending on the exact configuration and type of computing device, memory may be volatile, such as RAM, non-volatile, such as ROM, flash memory, or a combination thereof.

In other aspects, the computing device includes additional features or functionality. For example, the computing device may include additional storage such as removable storage or non-removable storage, including magnetic storage, optical storage, among others. In one aspect, computer readable instructions to implement one aspect provided herein are in storage. Storage may store other computer readable instructions to implement an operating system, an application program, among others. Computer readable instructions may be loaded in memory for execution by processing unit, for example.

The term "computer readable media" as used herein includes computer storage media. Computer storage media includes volatile and non-volatile, removable and non-removable media implemented in any method or technology for storage of information such as computer readable instructions or other data. Memory and storage are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device. Any such computer storage media is part of the computing device.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device includes input device(s) such as keyboard, mouse, pen, voice input device, touch input device, infrared cameras, video input devices, or any other input device. Output device(s) such as one or more displays, speakers, printers, or any other output device may be included with the computing device. Input device(s) and output device(s) may be connected to the computing device via a wired connection, wireless connection, or any combination thereof. In one aspect, an input device or an output device from another computing device may be used as input device(s) or output device(s) for the computing device. The computing device may include communication connection (s) to facilitate communications with one or more other devices, such as through network, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for feature descriptor matching, comprising:
a memory for receiving a first input image and a second input image;
a feature detector for detecting a first set of features from the first input image and a second set of features from the second input image;
a descriptor extractor for learning a first set of local feature descriptors from the first set of features of the first input image and a second set of local feature descriptors from the second set of features of the second input image based on a feature descriptor matching model trained using a ground truth data set including a first ground truth image and a second ground truth image;
the descriptor extractor for determining a listwise mean average precision (mAP) rank of a pool of candidate image patches from the second input image with respect to a queried image patch from the first input image based on the feature descriptor matching model, the first set of local feature descriptors, and the second set of local feature descriptors; and
a descriptor matcher for generating a geometric transformation between the first input image and the second input image based on the listwise mAP and a convolutional neural network (CNN),
wherein a geometric alignment is performed on the first ground truth image and the second ground truth image prior to training the feature descriptor matching model using the first ground truth image and the second ground truth image.

2. The system for feature descriptor matching of claim 1, wherein the first set of local feature descriptors or the second set of local feature descriptors includes a vector representation of a corresponding image patch.

3. The system for feature descriptor matching of claim 1, wherein the first set of local feature descriptors or the second set of local feature descriptors includes a binary descriptor or a real-valued descriptor.

4. The system for feature descriptor matching of claim 3, wherein the descriptor matcher generates the geometric transformation further based on an amount of computing resources available within the system for feature descriptor matching and one of:
binary descriptors of the first set of local feature descriptors and binary descriptors of the second set of local feature descriptors; or
real-valued descriptors of the first set of local feature descriptors and real-valued descriptors of the second set of local feature descriptors.

5. The system for feature descriptor matching of claim 1, wherein the first ground truth image and the second ground truth image of the ground truth data set are hard negatives with no matching features.

6. The system for feature descriptor matching of claim 1, wherein the geometric alignment is performed based on a spatial transformer network.

7. The system for feature descriptor matching of claim 1, wherein the descriptor extractor performs label mining based on clustering while learning the first set of local feature descriptors or the second set of local feature descriptors.

8. The system for feature descriptor matching of claim 7, wherein one or more image patches are clustered based on an inter-cluster distance from other image patches.

9. The system for feature descriptor matching of claim 1, wherein the feature descriptor matching model or the CNN is trained based on stochastic gradient descent (SGD).

10. A method for feature descriptor matching, comprising:
receiving a first input image and a second input image;
detecting a first set of features from the first input image and a second set of features from the second input image;
learning a first set of local feature descriptors from the first set of features of the first input image and a second set of local feature descriptors from the second set of features of the second input image based on a feature descriptor matching model trained using a ground truth data set including a first ground truth image and a second ground truth image;
determining a listwise mean average precision (mAP) rank of a pool of candidate image patches from the second input image with respect to a queried image patch from the first input image based on the feature descriptor matching model, the first set of local feature descriptors, and the second set of local feature descriptors;
generating a geometric transformation between the first input image and the second input image based on the listwise mAP and a convolutional neural network (CNN); and
performing a geometric alignment on the first ground truth image and the second ground truth image prior to training the feature descriptor matching model using the first ground truth image and the second ground truth image.

11. The method for feature descriptor matching of claim 10, wherein the first set of local feature descriptors or the second set of local feature descriptors includes a binary descriptor or a real-valued descriptor.

12. The method for feature descriptor matching of claim 11, further comprising generating the geometric transformation further based on an amount of computing resources available within a system for feature descriptor matching and one of:
binary descriptors of the first set of local feature descriptors and binary descriptors of the second set of local feature descriptors; or
real-valued descriptors of the first set of local feature descriptors and real-valued descriptors of the second set of local feature descriptors.

13. The method for feature descriptor matching of claim 10, wherein the first ground truth image and the second ground truth image of the ground truth data set are hard negatives with no matching features.

14. The method for feature descriptor matching of claim 10, wherein the geometric alignment is performed based on a spatial transformer network.

15. A system for feature descriptor matching, comprising:
a memory for receiving a first input image and a second input image;
a feature detector for detecting a first set of features from the first input image and a second set of features from the second input image;
a descriptor extractor for learning a first set of local feature descriptors from the first set of features of the first input image and a second set of local feature descriptors from the second set of features of the second input image based on a feature descriptor matching model trained using a ground truth data set including a first ground truth image and a second ground truth image, wherein the first set of local feature descriptors and the second set of local feature descriptors include a binary descriptor or a real-valued descriptor;
the descriptor extractor for determining a listwise mean average precision (mAP) rank of a pool of candidate image patches from the second input image with respect to a queried image patch from the first input image based on the feature descriptor matching model, the first set of local feature descriptors, and the second set of local feature descriptors; and
a descriptor matcher for generating a geometric transformation between the first input image and the second input image based on the listwise mAP and a convolutional neural network (CNN),
wherein a geometric alignment is performed on the first ground truth image and the second ground truth image prior to training the feature descriptor matching model using the first ground truth image and the second ground truth image.

16. The system for feature descriptor matching of claim 15, wherein the descriptor matcher generates the geometric transformation further based on an amount of computing resources available within the system for feature descriptor matching and one of:
binary descriptors of the first set of local feature descriptors and binary descriptors of the second set of local feature descriptors; or
real-valued descriptors of the first set of local feature descriptors and real-valued descriptors of the second set of local feature descriptors.

17. The system for feature descriptor matching of claim 15, wherein the first ground truth image and the second ground truth image of the ground truth data set are hard negatives with no matching features.

* * * * *